US012447541B2

(12) United States Patent
Rose et al.

(10) Patent No.: US 12,447,541 B2
(45) Date of Patent: Oct. 21, 2025

(54) BANDSAW OPERATIVE TO MAKE SIMULTANEOUS SPACED-APART CUTS WITH A SINGLE BLADE

(71) Applicant: Richard O. Rose, Houston, TX (US)

(72) Inventors: Richard O. Rose, Houston, TX (US); Lloyd Riggs, Chandler, TX (US)

(*) Notice: Subject to any disclaimer, the term of this patent is extended or adjusted under 35 U.S.C. 154(b) by 0 days.

(21) Appl. No.: 17/483,427

(22) Filed: Sep. 23, 2021

(65) Prior Publication Data

US 2023/0088333 A1 Mar. 23, 2023

(51) Int. Cl.
 B23D 53/06 (2006.01)
 B23D 53/00 (2006.01)
 B23D 55/10 (2006.01)

(52) U.S. Cl.
 CPC ........... B23D 53/005 (2013.01); B23D 53/06 (2013.01); B23D 55/10 (2013.01); *Y10T 83/707* (2015.04); *Y10T 83/7264* (2015.04)

(58) Field of Classification Search
 CPC .... B23D 53/06; B23D 55/10; B23D 57/0053; B23D 53/005; B23D 53/026; B26D 1/46; B28D 1/08; B28D 5/045; Y10T 83/7264; Y10T 83/707
 USPC ......................................................... 125/21
 See application file for complete search history.

(56) References Cited

U.S. PATENT DOCUMENTS

| | | | | |
|---|---|---|---|---|
| 594,542 A | * | 11/1897 | Knobel | B28D 1/08 299/35 |
| 822,056 A | * | 5/1906 | Knox | B23D 53/005 144/34.1 |
| 2,476,573 A | * | 7/1949 | Whicher | B27B 13/00 280/30 |
| 2,511,989 A | * | 6/1950 | Nardi | B23D 55/082 83/811 |

(Continued)

FOREIGN PATENT DOCUMENTS

| | | | | |
|---|---|---|---|---|
| CN | 107414933 A | * | 12/2017 | ............... B26D 1/52 |
| CN | 209579716 U | * | 11/2019 | |

(Continued)

OTHER PUBLICATIONS

JPS522588 English Translation; JPS522588; B23D53/04.*

(Continued)

*Primary Examiner* — Laura M Lee
(74) *Attorney, Agent, or Firm* — Fishman Stewart PLLC

(57) ABSTRACT

A bandsaw makes simultaneous, spaced-apart cuts in hard or soft materials with a single bandsaw blade. The invention is ideally suited to cutting spaced-apart parallel surfaces to form support blocks, however, different embodiment may be controlled or programmed to make parallel or non-parallel cuts at varying angles. The single bandsaw blade rides on circular wheels on both sides of a gap or passageway, such that a first portion of the blade crosses the passage along a first, upper path, and a second portion of the bandsaw blade crosses the passage along a second, lower path. A table moves the material through the passage, whereupon the (Continued)

material is simultaneously cut along two planes corresponding to the upper and lower paths of the bandsaw blade. A preferred embodiment includes a first set of upper and lower wheels on one side of the passage, and a second set of upper and lower wheels on an opposing side of the passage.

18 Claims, 5 Drawing Sheets

(56) References Cited

U.S. PATENT DOCUMENTS

| | | | | |
|---|---|---|---|---|
| 2,743,745 | A * | 5/1956 | Teague | B23D 53/005 144/253.7 |
| 3,263,537 | A * | 8/1966 | Rehman | B26D 3/008 83/820 |
| 3,635,207 | A * | 1/1972 | Grage | B28D 1/08 125/21 |
| 3,829,970 | A * | 8/1974 | Anderson | B23D 55/10 30/274 |
| 4,915,000 | A * | 4/1990 | MacFarlane | B23D 59/008 125/21 |
| 5,001,957 | A * | 3/1991 | Steckler | B23D 55/082 83/792 |
| 5,011,957 | A * | 4/1991 | Efner | C07C 319/12 556/77 |
| 5,213,022 | A * | 5/1993 | Elgan | B23D 53/04 83/803 |
| 5,509,206 | A * | 4/1996 | Rowe | B23D 53/005 83/792 |
| 5,813,307 | A * | 9/1998 | Richmond | B23D 55/082 83/788 |
| 6,199,468 | B1 * | 3/2001 | Hackbarth | B26D 1/46 83/788 |
| 6,230,602 | B1 * | 5/2001 | Baker | B27B 15/08 83/819 |
| 6,442,848 | B1 * | 9/2002 | Dean | B23D 55/10 30/380 |
| 6,513,514 | B1 * | 2/2003 | Micheletti | B28D 1/08 125/16.02 |
| 6,834,572 | B1 * | 12/2004 | Richmond | B23D 57/02 83/788 |
| 7,770,575 | B2 * | 8/2010 | Brocco | B23D 57/0053 125/21 |
| 9,687,923 | B2 * | 6/2017 | Chiao | B23D 53/04 |
| 10,131,067 | B2 * | 11/2018 | Munteanu | B26D 1/54 |
| 10,882,126 | B2 * | 1/2021 | Hungerford, Jr. | B23D 53/08 |
| 2021/0370539 | A1 * | 12/2021 | Arrighi | B26D 1/46 |

FOREIGN PATENT DOCUMENTS

| | | | | |
|---|---|---|---|---|
| CN | 115302007 | A * | 11/2022 | |
| DE | 962055 | C * | 11/1953 | B28D 1/086 |
| DE | 1919963 | B * | 10/1971 | B26D 3/008 |
| DE | 10129909 | A1 * | 1/2003 | B26D 1/46 |
| EP | 0947274 | A2 * | 10/1999 | B23D 55/10 |
| EP | 4074446 | A2 * | 10/2022 | B23D 53/04 |
| GB | 2394694 | A * | 5/2004 | B23D 53/003 |
| JP | S522588 | * | 1/1977 | B23D 53/04 |
| JP | 2005205575 | A * | 8/2005 | |
| JP | 2008073817 | A * | 4/2008 | |
| JP | 2012016755 | A * | 1/2012 | |
| WO | WO-9314914 | A1 * | 8/1993 | B23D 57/0053 |

OTHER PUBLICATIONS

CN-115302007-A English Translation; Ishikawa Y; Liu G.*
JP-2005205575-A English Translation; Aug. 2005 JP Ishikawa Y.*
JP208073817-A English Translation; Apr. 3, 2008; Ishikawa Y.*

* cited by examiner

BANDSAW OPERATIVE TO MAKE SIMULTANEOUS SPACED-APART CUTS WITH A SINGLE BLADE

FIELD OF THE INVENTION

This invention relates generally to bandsaws and, in particular, to a machine that is capable of making simultaneous, spaced-apart cuts, including parallel cuts.

BACKGROUND OF THE INVENTION

There are instances wherein spaced-apart cuts must be made in particular materials. As one example, blocks of foam are used to support piping in petrochemical plants. This foam is typically cut with specialized bandsaws to produce spaced-apart, parallel surfaces at predetermined distances such as 3 or 4 feet. Currently foam blocks are fed into existing bandsaws multiple times to produce these blocks, which wastes time and money. While it may be possible to use multiple machines or multiple blades in a single machine, this also presents maintenance and cost issues since high-end blades can cost hundreds of dollars requiring dozens of changes per month.

There is an outstanding need, therefore, for a band saw capable of making simultaneous spaced-apart cuts in various materials for various industries.

SUMMARY OF THE INVENTION

This invention improves upon the existing art by providing a bandsaw operative to make simultaneous, spaced-apart cuts, including parallel cuts with a single bandsaw blade. The invention is ideally suited to forming spaced-apart surfaces in support blocks made from foam or other soft material. In a preferred embodiment, the system may be user adjusted to make parallel surfaces spaced apart at 36 or 48 inches for specific applications. However, the system is not limited in these respects and, in fact, may be controlled or programmed to make parallel or non-parallel cuts in soft or hard materials. I each case, the cuts are made simultaneously and with the same blade.

A bandsaw constructed in accordance with the invention includes a plurality of wheels, each with a circular outer surface, with at least one of the wheels being powered for rotation by a motor. All of the wheels are supported for rotation in the same plane, with one or more of the wheels being positioned on one side of a passage, and one or more of the wheels being positioned on an opposing side of the passage. The single bandsaw blade rides on the wheels on both sides of the passage, such that a first portion of the blade crosses the passage along a first, upper path, and a second portion of the bandsaw blade crosses the passage along a second, lower path spaced apart from the first path. A table moves the material through the passage, whereupon the material is simultaneously cut along two planes corresponding to the upper and lower paths of the bandsaw blade.

In accordance with one embodiment, sets of upper and lower wheels are supported for rotation on both sides of the passage, and wherein the bandsaw blade rides on upper portions of the upper wheels to establish the upper path, and the bandsaw blade rides on lower portions of the lower wheels to establish the lower path. The rotational axes of the lower wheels may be fixed with the axes of the upper wheels being adjustable by moving the upper wheels along the radial arcs. Conversely, the rotational axes of the upper wheels may be fixed with the axes of the lower wheels being adjustable by moving the upper wheels along the radial arcs. In both cases, the adjustment changes the spacing of the simultaneous cuts made in the workpiece material. The table is height-adjustable and/or motor-driven for added automation.

A preferred embodiment includes four circular drive wheels (plus one or more tensioning wheels), each rotatable about a separate axis, with at least one of the wheels being powered for rotation by a motor. All of the wheels rotate in the same plane, with a first set of upper and lower wheels being positioned on one side of a passage, and a second set of upper and lower wheels being positioned on an opposing side of the passage. The single bandsaw blade rides on all four drive wheels, such that upper and lower sections of the blade cross the passage along different, spaced-apart upper and lower paths. A table moves the material through the passage, whereupon the material is simultaneously cut along two planes corresponding to the spaced-apart paths of the bandsaw blade.

In a more preferred configuration, the axes four wheels form a parallelogram, and wherein the dimensions of the parallelogram are user-adjustable to set the distance between the upper and lower sections of the blade. As one example, the configuration of the parallelogram may be user-adjustable to set the distance between the upper and lower sections of the blade between 36" and 48". In all embodiments, one or more wheels may be added for maintaining a desired tensioning of the blade.

DETAILED DESCRIPTION OF THE PREFERRED EMBODIMENTS

Figure 1:
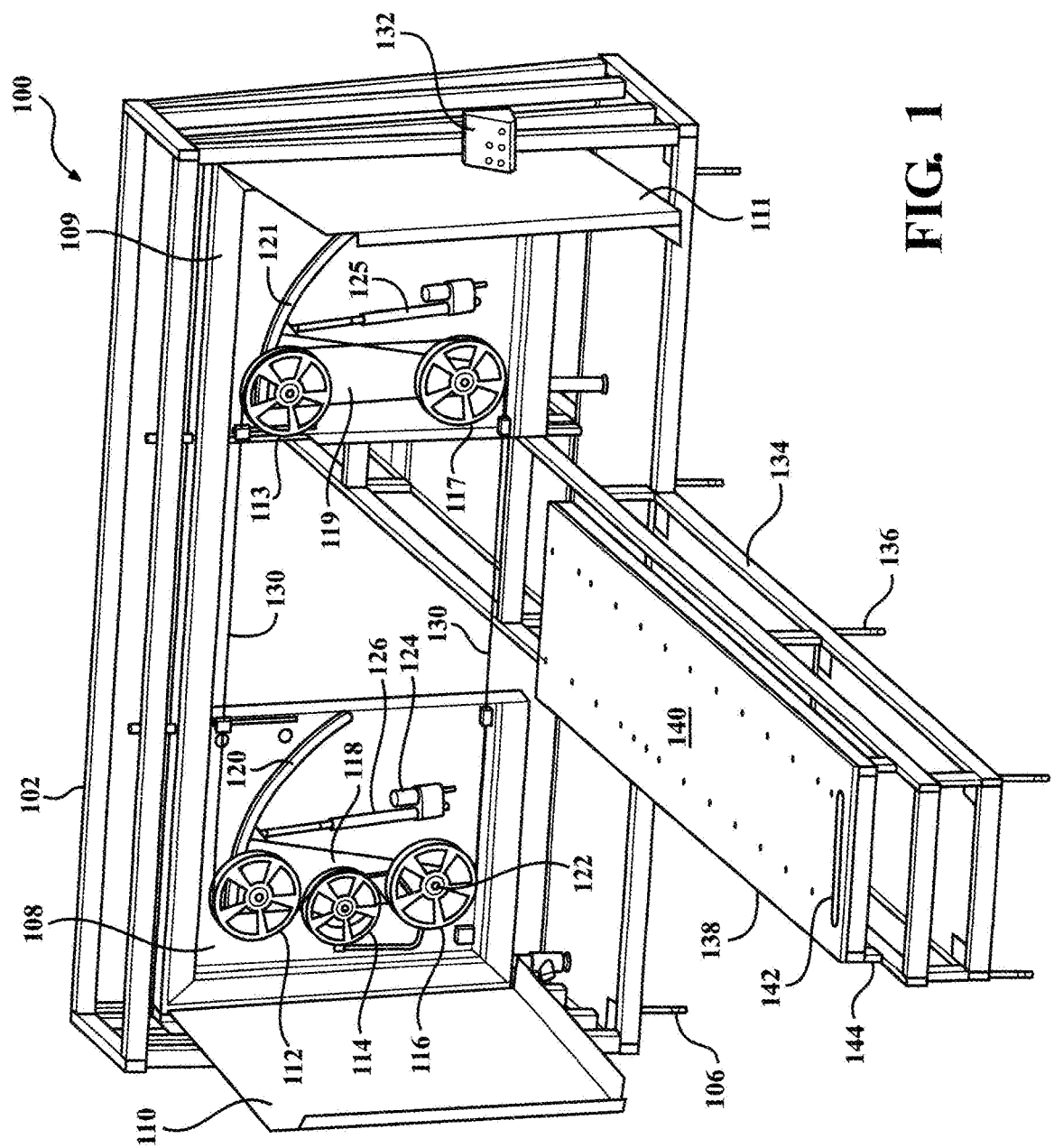
FIG. 1 is an oblique drawing of a preferred embodiment of the invention configured to make a pair of parallel, spaced-apart cuts in a material with the cuts being spaced apart at a first distance.
Figure 2:
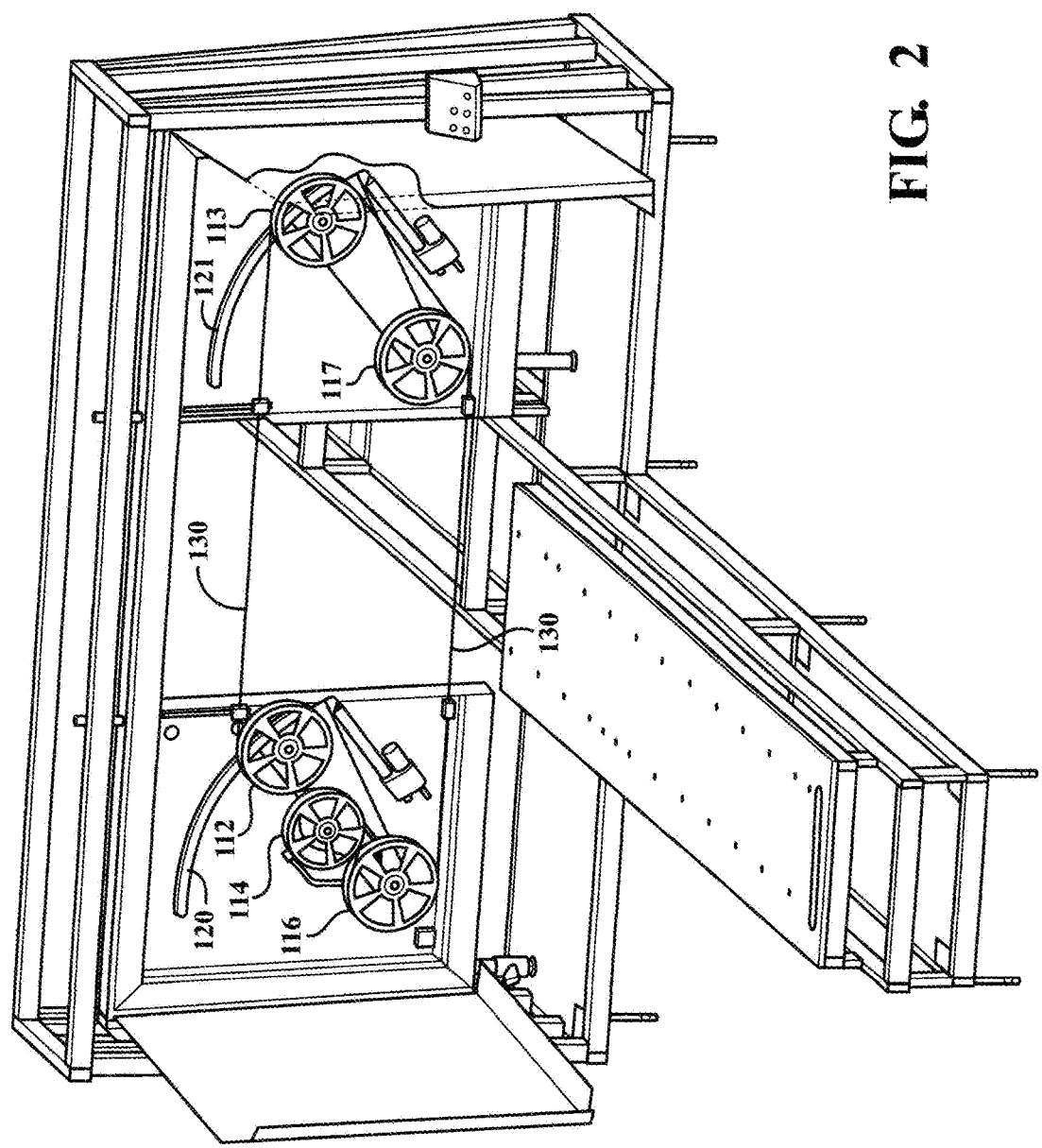
FIG. 2 is an oblique drawing of a preferred embodiment of the invention configured to make a pair of cuts in a material with the cuts being spaced apart at a second distance different from the first distance.

Now making reference to the accompanying drawings, FIGS. 1, 2 are oblique representations of a preferred embodiment of the invention shown generally at 100. In FIG. 1, the bandsaw is configured to make a pair of parallel cuts in a material spaced apart at a first distance, and FIG. 2 shows the same machine making a pair of parallel cuts with a different (smaller) spacing.

The bandsaw is built around a rigid frame 102, preferably constructed from steel dimensional members. The frame 102 may be spaced apart from a floor surface with a plurality adjustable legs 106. Within frame 102 there is mounted a pair of metal boxes, each with respective doors 110, 111 that open to change blade 130 or perform other maintenance or adjustment operations. The doors 110, 111 would be closed to isolate the machinery during operation.

Box 108 includes a pivoting plate 118 upon which there is mounted three wheels, including an upper wheel 112, lower wheel 116 and intermediate tensioning wheel 114.

Blade 130 is dressed around the top of wheel 112, the inner side of wheel 114, and the bottom of wheel 116, such that wheel 114 may be moved independently to tighten and loosen blade 130. Box 109 is similar, including an upper wheel 113 and lower wheel 117 mounted on pivoting plate 119, but without the need for an intermediate blade tensioning wheel. Instead, blade 130 is dressed around the top of wheel 113 and directly down and around the bottom of wheel 117.

Plate 118 includes a pin that rides in a circular groove 120 formed at the back of box 108. Similarly, plate 119 includes a protrusion that rides within circular track 121 in box 109. The center of the radius for track 120 corresponds to the central axis (122) of wheel 116, and the center of the radius for track 121 corresponds to the axis of wheel 117.

Plate 118 is coupled to an extendable linear actuator 126, and plate 119 is likewise coupled to an actuator 125. In each case, the upper part of the actuator is hinged to an upper portion of a respective plate, whereas the lower portion of each actuator is hinged to a lower pivot point. When the actuators 125, 126 are extended, plates 118, 119 are vertically oriented, such that the spacing between the upper and lower horizontal sections of blade 130 are spaced apart at a first distance. As shown in FIG. 2, when the actuators 124, 125 are contracted, the upper and lower horizontal sections of blade 130 are spaced apart at a different distance.

The machine further includes a lower frame 134 with anchor bolts 136 supporting a material feed table 140. The lower frame 134 extends through the central opening of the saw between boxes 108, 109. Material to be cut is placed on table 140, typically against stop 142, and fed through the opening or gap between the boxes 108, 109, at which time the same blade makes simultaneous lower and upper cuts in the material (assuming is taller the upper portion of blade 130). The table may either be moved manually, or the machine may be equipped with a power table feed.

The lower cut is set at a predetermined, fixed distance from the upper surface of the table, whereas the distance between the lower and upper cuts is variable and selected with a user control 132. In one embodiment for cutting support foam, the lower cut may be an inch, more or less, from the table surface, whereas the distance between the cutting portions of blade 130 may be set at specific distances such as 48" when the actuators 125, 126 are fully extended as shown in FIG. 1, and 36" when the actuators 125, 126 are fully retracted as shown in FIG. 2.

Note that in accordance with the embodiment of FIGS. 1, 2, the upper and lower horizontal sections of blade 130 at all times parallel as the material passes through the opening or gap between boxes 108, 109. With the exception of the curved corners around the outer wheels and tensioning wheel 114, path of blade 130 somewhat approximates a parallelogram, whereby the spacing can be changed without altering the overall length of the blade. While the outer surfaces of the wheels may be flat or grooved, they may also be crowned to help the saw track better on the wheel, and keep its position more stable. Any one or more of the outer wheels may be used as the drive wheel. In embodiment shown, wheel(s) is/are driven by an electric motor (not shown) of sufficient horsepower to drive the wheels as the blade cuts through the workpiece.

In the embodiment of FIGS. 1, 2 actuators 125, 126 would be operated in unison. The actuators may be implemented with any appropriate technology (i.e., electromagnetic, stepper- or servo-controlled), so long as stroke length and precision are maintained. The need for positional feedback would not be essential, since the ends of curved tracks 120, 120 would set the two distances.

Figure 3:
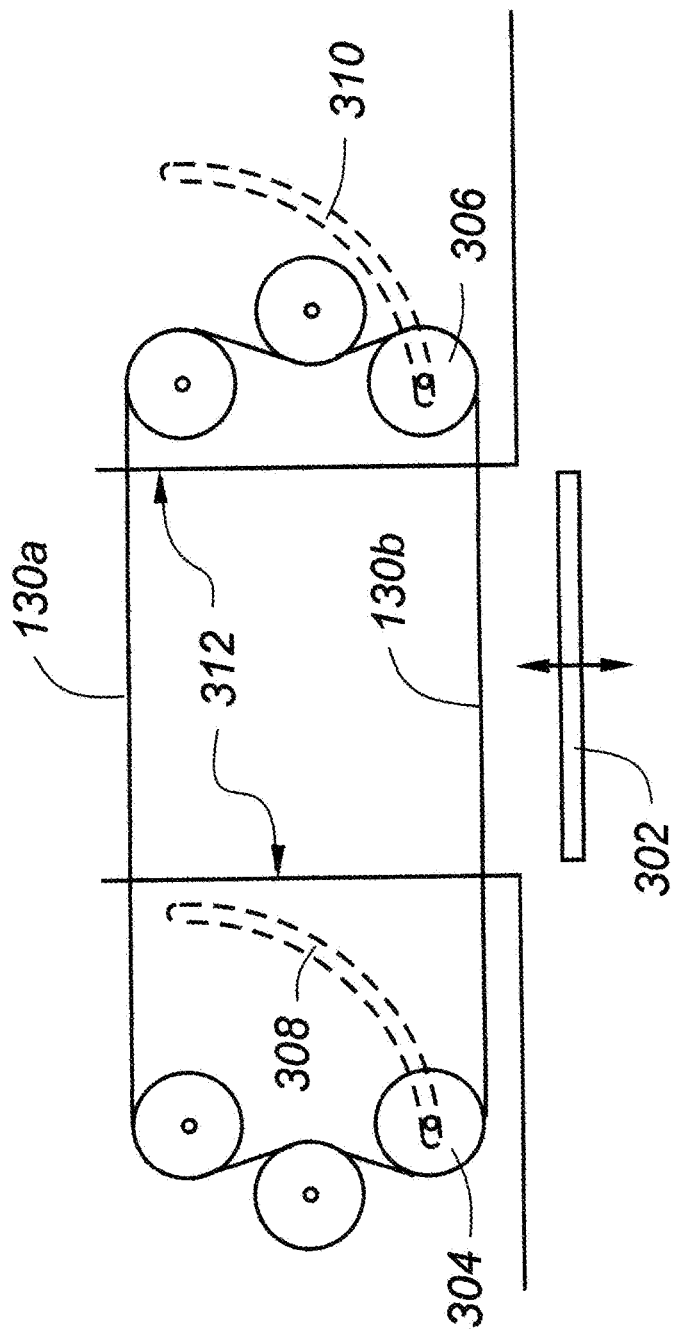
FIG. 3 is a drawing that shows how a lower cut may be adjusted relative to a fixed upper cut.

FIG. 3 illustrates some options applicable to the invention. For one, if the wheels and tracks of FIGS. 1, 2 are flipped vertically, operation would be similar, but the horizontal height from blade 130a relative to table 302, whereas the height of blade 130b would move up and down as wheels 304, 306 moved along tracks 308, 310. In all embodiments, in addition to a table powered to move through gap 312, the height of the table may also be manually or automatically adjusted. Further, although one tensioning wheel 114 is depicted in FIGS. 1, 2, additional tensioning wheels (i.e., 314) may be added.

Figure 4:
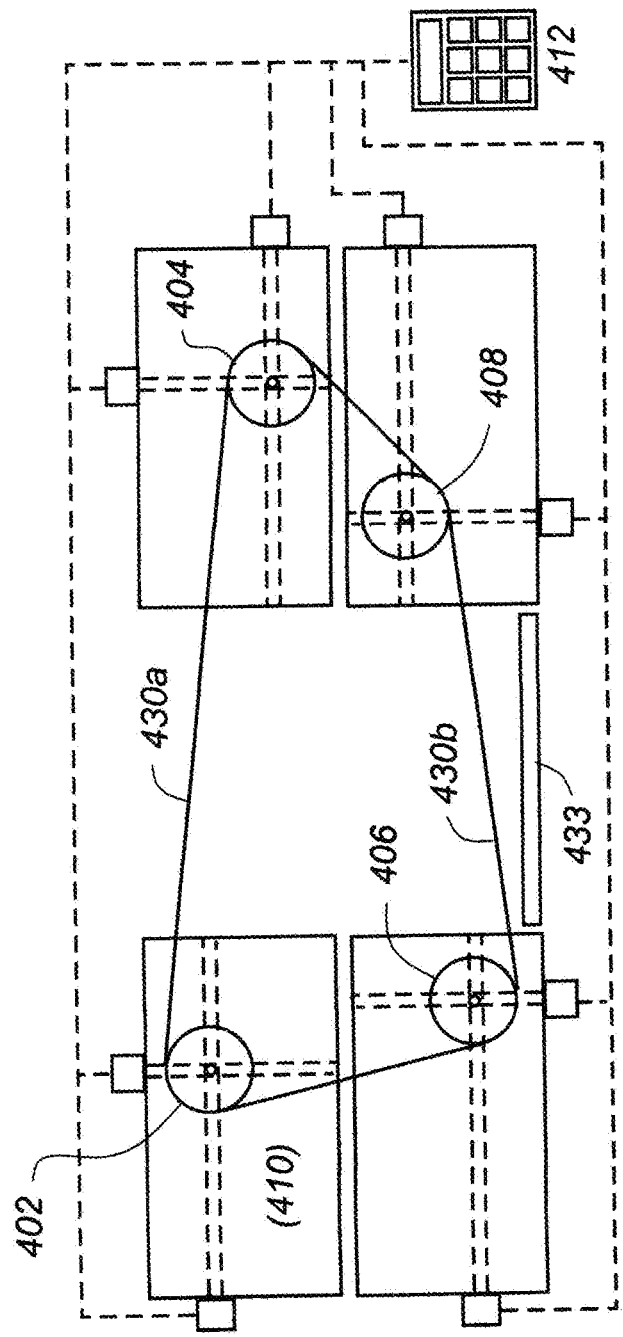
FIG. 4 illustrates an arrangement whereby by arbitrary parallel and non-parallel cuts may be made.

Whereas, in the preferred embodiment for foam cutting, spaced-apart, parallel blade distances such as 36" and 48" may be preset, with more sophisticated technology, any parallel and non-parallel cuts may simultaneously be made (assuming a fixed blade length). FIG. 4, for example, shows how some or all of the drive wheels 402, 404, 406, 408, may be translated horizontally and vertically with x-y stages (i.e., 410) controlled by programmable logic controller (PLC) or general-purpose computer 412. With such an arrangement, a user would input the angles of blade portions 430a, b, and desired distances from each other or table 433, and all the positions of the wheels would be computed. In this and in all other embodiments, positional feedback may be used to ensure accuracy. Note that with sufficiently precise positioning, even tensioning could be taken into account, possibly obviating the need for a tensioning wheel (not shown).

Figure 5:
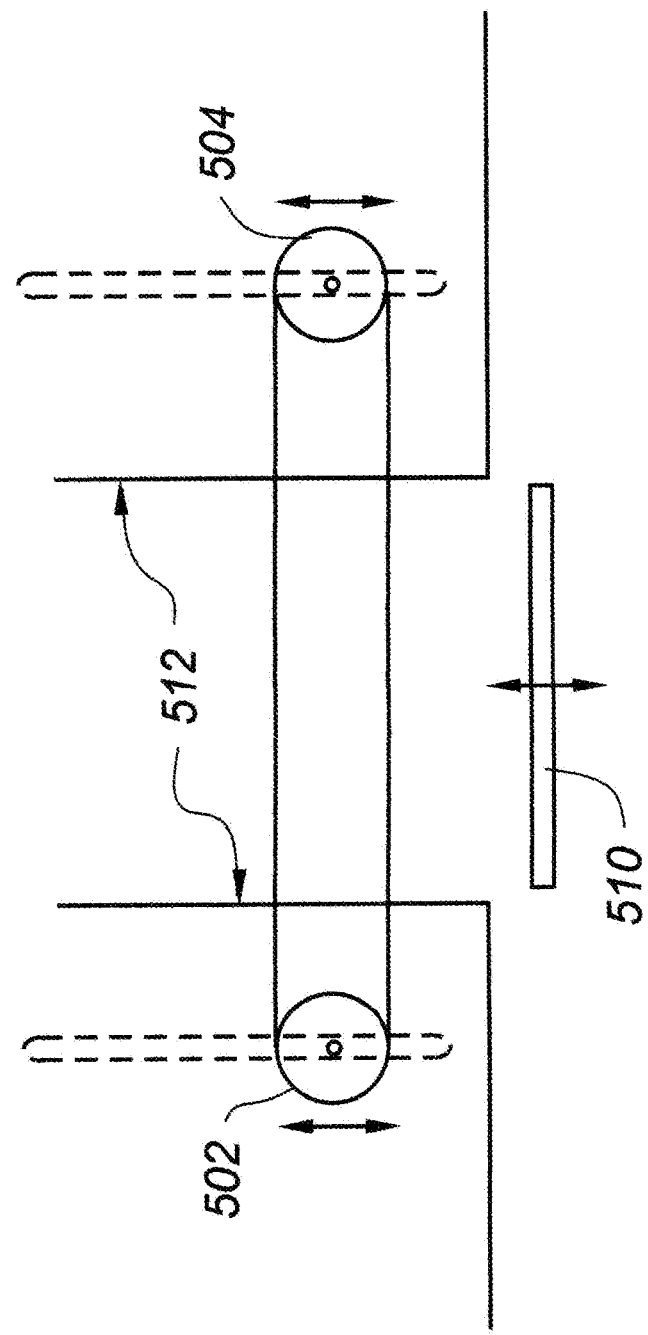
FIG. 5 shows an embodiment wherein only one wheel is used on one or both sides of the saw.

FIG. 5 illustrates a further embodiment wherein only one wheel is used on either side of gap or passage 512. Wheels 502, 504 would be moved up and down via PLC control, for making simultaneous, parallel cuts at a set distance. The respective heights of wheels 502, 504, may be different to achieve parallel cuts at an angle to table 510, with appropriate tensioning (not shown).

In terms of the blades applicable to the invention, for soft materials such as foam, a conventional bandsaw blade may be used to cut in both directions simultaneously. For harder materials, such as wood, plastic, metal, and so forth, more specialized bidirectional blades may be employed.

The invention claimed is:

1. A bandsaw, comprising:
 a plurality of wheels, each with a circular outer surface, with at least one of the plurality of wheels being powered for rotation via a motor;
 wherein all of the plurality of wheels are supported for rotation in the same vertical plane, with a first subset of the plurality of wheels positioned on one side of a passage, and a second subset of the plurality of wheels positioned on an opposing side of the passage;
 a single bandsaw blade riding on the first subset of the plurality of wheels and the second subset of the plurality of wheels such that a first portion of the bandsaw blade crosses the passage along a first straight path and a second portion of the bandsaw blade crosses the passage along a second straight path disposed spaced apart from the first path; and
 a table for moving a material through the passage in a horizontal direction perpendicular to the vertical plane, whereupon the material is simultaneously cut along two flat horizontal planes corresponding to the first and second paths of the bandsaw blade;
 wherein at least one wheel of the first subset of the plurality of wheels is adjustable along an arc-shaped path to adjust a distance between the first and second paths.

2. The bandsaw of claim 1, wherein the first and second paths are parallel.

3. The bandsaw of claim 1, wherein:
the plurality of wheels includes upper and lower wheels on both sides of the passage;
the bandsaw blade rides on upper portions of the upper wheels to establish the first path; and
the bandsaw blade rides on lower portions of the lower wheels to establish the second path.

4. The bandsaw of claim 3, wherein:
the plurality of wheels are each rotatable about a separate rotational axis;
the rotational axes of the lower wheels are fixed;
the rotational axes of the upper wheels are each movable along a respective radial arc with a center coincident with the rotational axis of an associated one of the lower wheels; and
the first and second paths are parallel, and the distance between the first and second paths is adjustable via moving the upper wheels along the radial arcs.

5. The bandsaw of claim 3, wherein:
the plurality of wheels are each rotatable about a separate rotational axis;
the rotational axes of the upper wheels are fixed;
the rotational axes of the lower wheels are each movable along a respective radial arc with a center coincident with the rotational axis of an associated one of the upper wheels; and
the first and second paths are parallel, and the distance between the first and second paths is adjustable by moving the lower wheels along the radial arcs.

6. The bandsaw of claim 1, wherein:
the plurality of wheels includes a first wheel, a second wheel, a third wheel, and a fourth wheel;
the first subset of the plurality of wheels includes the first wheel and the second wheel;
the second subset of the plurality of wheels includes the third wheel and the fourth wheel; and
a rotational axis of the first wheel, a rotational axis of the second wheel, a rotational axis of the third wheel, and a rotational axis of the fourth wheel are arranged at vertices of an imaginary parallelogram lying in the vertical plane.

7. The bandsaw of claim 6, wherein the internal angles of the imaginary parallelogram are user-adjustable to set a distance between the first and the second paths.

8. The bandsaw of claim 6, wherein the imaginary parallelogram has oblique internal angles.

9. The bandsaw of claim 1, wherein the at least one wheel of the first subset of the plurality of wheels is adjustable in the vertical plane and relative to another wheel of the plurality of wheels along the arc-shaped path.

10. A bandsaw, comprising:
a passage through which a material is passable;
a plurality of wheels rotatable in a single vertical plane, a first subset of the plurality of wheels arranged on a first side of the passage, a second subset of the plurality of wheels arranged on a second, opposite side of the passage;
a motor connected to at least one of the plurality of wheels;
a table via which the material is movable through the passage in a horizontal direction extending transversely to the vertical plane; and
a single bandsaw blade riding on the first subset of the plurality of wheels and the second subset of the plurality of wheels such that the bandsaw blade crosses the passage along a first blade path and along a second blade path;
wherein the first blade path and the second blade path disposed spaced apart from one another in a vertical direction extending parallel to the vertical plane such that, when the material is moved through the passage in the horizontal direction, the material is simultaneously cut along two horizontal planes corresponding to the first blade path and the second blade path; and
wherein at least one wheel of the first subset of the plurality of wheels is adjustable along an arc-shaped path.

11. The bandsaw of claim 10, wherein:
the first subset of the plurality of wheels includes a first wheel and a second wheel;
the first wheel is adjustable along the arc-shaped path; and
the arc-shaped path extends at least partially around a rotational axis of the second wheel.

12. The bandsaw of claim 11, wherein a centroid of the arc-shaped path is defined by the rotational axis of the second wheel.

13. The bandsaw of claim 10, further comprising a plate on which the first subset of the plurality of wheels are mounted.

14. The bandsaw of claim 13, wherein the plate is pivotable such that the at least one wheel of the first subset of the plurality of wheels is adjustable along the arc-shaped path via pivoting the plate.

15. The bandsaw of claim 14, wherein the plate is pivotable about a rotational axis of the second wheel.

16. The bandsaw of claim 14, further comprising a box and a track, wherein:
the track defines the arc-shaped path; and
the plate is pivotably connected to the box and is adjustably engaged with the track.

17. The bandsaw of claim 16, wherein:
the track is a groove disposed in and defined by the box; and
the plate includes a pin that is adjustably disposed within the groove.

18. The bandsaw of claim 14, further comprising a box and an extendable linear actuator, wherein:
the plate is pivotably connected to the box;
the linear actuator is pivotably connected to the box at a first pivot point and is pivotably connected to the plate at a second pivot point; and
the plate is pivotable relative to the box via actuating the linear actuator.

* * * * *